June 18, 1968   R. L. DEGA   3,388,915

SEALING MEANS

Filed July 19, 1965

INVENTOR.
Robert L. Dega
BY
J. L. Carpenter
ATTORNEY

United States Patent Office 3,388,915
Patented June 18, 1968

3,388,915
SEALING MEANS
Robert L. Dega, Utica, Mich., assignor to General Motors Corporation, Detroit, Mich., a corporation of Delaware
Filed July 19, 1965, Ser. No. 472,867
1 Claim. (Cl. 277—177)

ABSTRACT OF THE DISCLOSURE

A sealing assembly for sealing between a relatively reciprocating cylinder and piston wherein a flexible O-ring, retained within a low-friction circumferential groove formed in the piston, is compressed into sealing engagement with the inner surface of the cylinder. The inner surface of the cylinder and the piston are relatively sized so that minimum clearance exists therebetween and the groove is shaped so that the O-ring continuously engages the seating surface of the groove thereby permitting the O-ring to move freely within the groove and continuously roll upon the inner surface of the cylinder as the piston and the cylinder are relatively reciprocated.

---

Figure 1:
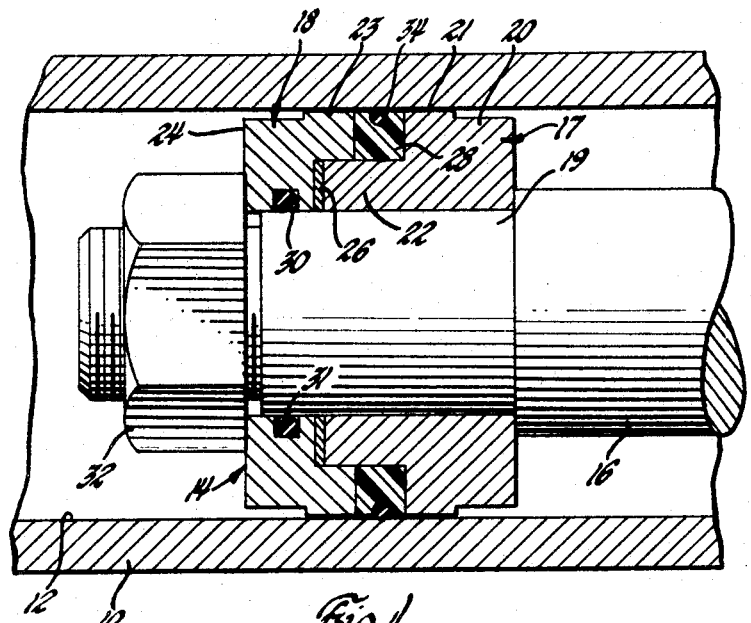

Many such devices employ a ring seal, commonly a rubber O-ring, to prevent the leak of high pressure fluid across the piston through the clearance area between the piston and cylinder surfaces. Leak-tight sealing of high pressure fluids by ring seals has been ineffective because such a seal requires that the ring seal fit tightly against the members and this results in considerable frictional resistance between the ring seal and the member surfaces. Although surface finishes may be in the order of 15 microinches or less, they are still relatively rough and cause abrasive wear of the seal as it is dragged over the surfaces.

The life of such ring seals could be greatly increased if the seal could be made to roll over the surfaces which it contacts. A ring seal which is nestled between a piston and a cylinder and free to roll cannot withstand a pressure differential and will be blown out from between the piston and the cylinder upon application of pressure. Use of a multiplicity of seals will not significantly increase the pressure capabilities of the system. If the ring seal is retained within a groove in the periphery of the piston, it is free to roll over the cylinder surface only so long as it can move freely within the groove. When the ring seal becomes lodged within the groove it cannot roll over the relatively rough cylinder surface and it is then dragged and abrasively worn to failure.

This invention provides a sealing means which effectively seals relatively reciprocating members without excessive abrasive wear of the ring seal. The sealing means is especially suited for high pressure usage and includes an O-ring retained within a groove having a specially contoured and low friction seating surface to permit the O-ring to slide and roll relative to the members being sealed. When pressure is applied to the sealing means and reciprocating movement between the members begins, the O-ring will move axially without tearing or abrasive wear because it has a continuous rolling movement upon the member surfaces which it engages and is free to slide upon the low friction seating surface.

The sealing means of this invention has been tested in reciprocation type devices with applied fluid pressures as high as 15,000 p.s.i. The results have been entirely successful with the O-ring fully retained within the groove and with no appreciable abrasive wear of the O-ring.

Accordingly, it is an object of this invention to provide improved sealing means for sealing relatively reciprocating members.

Another object of the invention is to provide such a sealing means which is effective to provide leak-tight sealing of high pressure fluids without excessive abrasive wear of the sealing member.

Yet another object is to provide such a sealing means in which the ring seal continuously rolls relative to the reciprocating surfaces of the members.

A further object of the invention is to provide such a sealing means wherein one of the members has a specially contoured and low friction seating surface for the ring seal.

Figure 2:
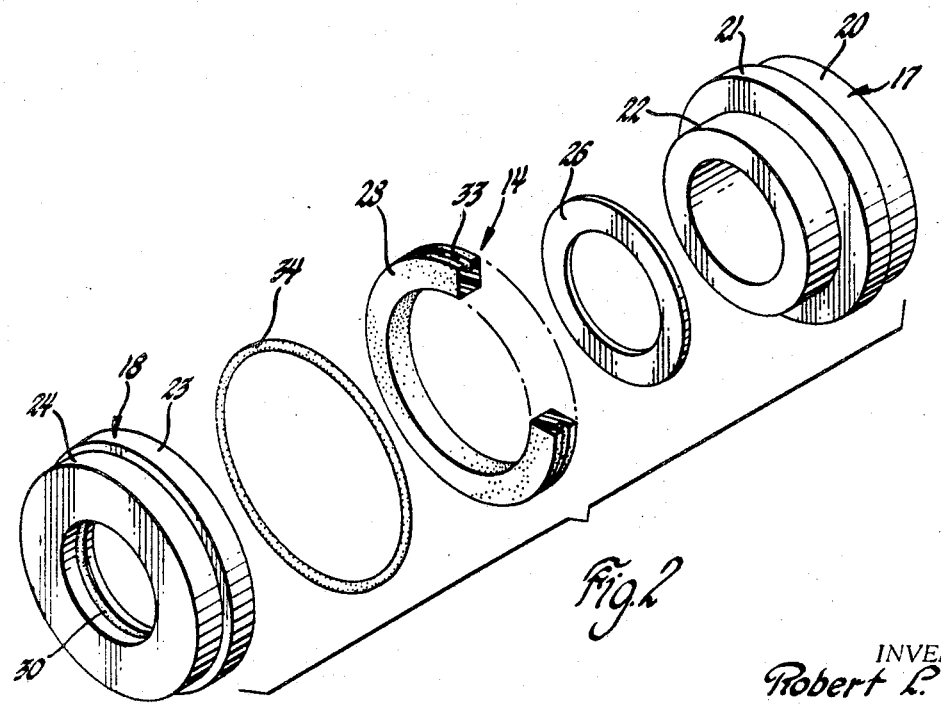

Other objects of the invention will become apparent to one skilled in the art from the following detailed description taken in conjunction with the drawing in which:

FIGURE 1 is a view with certain portions in section of a piston and cylinder arrangement embodying a sealing means according to this invention; and FIGURE 2 is an exploded view of the piston shown in FIGURE 1.

Referring to FIGURE 1, there is shown a portion of a cylinder 10 having an annular inner surface 12 and within which is disposed a piston 14 carried on a piston rod 16. The piston and rod assembly is reciprocably movable relative to the cylinder over a certain length or stroke. The outer diameter of the piston 14 and inner diameter of the cylinder 10 are dimensioned so as to establish a small clearance between the two members. When the system is pressurized, this clearance represents a pressure leakage annulus which must be sealed.

The piston 14 includes annular interfitting members 17 and 18 which are received on a shouldered portion 19 of the piston rod 16. The member 17 includes annular portions 20, 21 and 22, and the member 18 includes annular portions 23 and 24. The outer diameters of portions 20 and 24 are equal. The outer diameters of portions 21 and 23 are also equal and cooperate with the diameter of surface 12 to establish between the piston 14 and the cylinder 10 the minimum pressure leakage annulus previously mentioned.

Portion 22 fits within portion 23. A gasket 26 located between the juxtaposed axial faces of portions 22 and 24 seals these faces to each other and also spaces the juxtaposed axial faces of portions 21 and 23 relative to each other. These faces and the outer surface of portion 22 provide a groove which receives an annular retainer ring 28 having an outer surface of a diameter generally equal to the outer diameter of the portions 21 and 23. Ring 28 seals the juxtaposed axial faces of portions 21 and 23 to each other and to the outer surface of portion 22. An O-ring 30 received within a groove 31 in the inner surface of portion 24 seals this surface to the portion 19 of the rod 16. A nut 32 threaded on the portion 19 of shaft 16 holds the members 17 and 18 in tight engagement with each other and also holds the various juxtaposed axial faces of portions 21 and 23 and 22 and 24, respectively, in tight sealing engagement with ring 28 and gasket 26, respectively, so that leakage of fluid between the members 17 and 18 is effectively prevented.

The retainer ring 28 is made of carbon-filled polytetrafluoroethylene, commonly available as Teflon, or other low friction material, or it may be made of a suitable metal and coated with polytetrafluoroethylene. A circumferential generally U-shaped groove 33 is machined into the outer surface of the retainer ring 28 and provides a low friction seating surface for a resilient O-ring 34 preferably made of rubber. The O-ring groove 33 is specially designed to provide a contoured seating surface that continuously engages the O-ring 34 when the O-ring diameter is radially compressed approximately 10 percent. Such a design is adequate to provide initial sealing and yet to limit the movement, or axial extrusion, of the O-ring when pressure is applied. The O-ring groove 33 provides a seat which has a very low coefficient of friction, whether dry or lubricated, in comparison with the frictional properties of the cylinder surface 12. For high pressure applications ranging between 1,000 and 15,000 pounds per square inch, it is desirable to provide the surface 12 with a surface finish in the order of 15 microinches or less.

When pressure is applied to the piston and sealing arrangement and the piston stroke begins, the O-ring, which was forced into the porosity of the cylinder surface 12 by initial compression or residual pressure, rolls upon the cylinder surface. The rolling movement of the O-ring is possible because that portion of the O-ring within the groove 33 is slidably rotatable upon the low friction seating surface. The imbedded O-ring material is, in effect, pulled out of the surface porosity in a generally radial direction, substantially reducing the breakaway friction and consequent O-ring wear. As the piston stroke continues, the O-ring continuously rolls upon the surface 12 and slides upon the low friction seating surface of groove 33 without binding or wind-up. At piston reversal, when static conditions prevail, the O-ring material is again compressed into the porosity of the cylinder surface but will roll upon the surface as the return stroke begins. Since the O-ring rolls over the surface and is not dragged, frictional wear is greatly reduced and the useful life of the O-ring is greatly extended, making possible an effective sealing means for reciprocating members subjected to the high fluid pressure previously mentioned.

It is obvious that various changes could be made in the above described construction without departing from the scope of the invention. For instance, the retainer ring could be made an integral part of the piston and the O-ring groove could be machined into the piston's outer surface. The groove and piston surface could then be coated with Teflon to provide a low friction surface. In any case, it is important that the surface of the O-ring groove be made as smooth as possible with no rough sections to cause the O-ring to twist and bind as it moves over the low friction surface.

Where the retainer ring is made as an individual member, it may act as a guide or piston gland to support the piston away from the cylinder wall, thus preventing scuffing and associated seal wear.

Thus, improved sealing means for sealing relatively reciprocable members have been provided.

I claim:

1. Sealing means for sealing the space between relatively reciprocating members comprising a cylinder having an axially extending inner surface, said inner surface having a finish of 15 microinches or less, a piston having an axially extending outer surface disposed within for reciprocated movement relative to said cylinder, said inner surface and said outer surface relatively sized to establish a minimum pressure leakage annulus therebetween, said piston having one axial surface exposed to a high pressure fluid ranging between 1,000 and 15,000 pounds per square inch, the other axial surface of said piston exposed to atmosphere, a U-shaped circumferential groove having a low-friction seating surface of polytetrafluoroethylene or like material formed in said outer surface, a flexible toroidal sealing member of resilient material seated within the groove and extending radially outwardly under approximately 10 percent compression in assembly into sealing engagement with said inner surface to seal said pressure leakage annulus, said seating surface of said groove continuously engaging said sealing member in said assembly whereby said sealing member slidably moves within said groove and continuously rolls upon said inner surface as said piston and said cylinder relatively reciprocate.

References Cited

UNITED STATES PATENTS

| 2,437,586 | 3/1948 | Aber | 277—177 X |
| 2,593,193 | 4/1952 | Rockwell | 277—177 |

FOREIGN PATENTS

| 982,860 | 2/1965 | Great Britain. |

SAMUEL ROTHBERG, *Primary Examiner.*